(12) United States Patent
Fernandez Tapia

(10) Patent No.: US 6,319,533 B1
(45) Date of Patent: Nov. 20, 2001

(54) PROCESS FOR ECOLOGIC COOKING OF FOODSTUFF

(75) Inventor: Juan Carlos Fernandez Tapia, Lo Barnechia Santiago (CL)

(73) Assignee: Admistradora de Patentes de Invencion Cono sur S.A., Santiago (CL)

( * ) Notice: Subject to any disclaimer, the term of this patent is extended or adjusted under 35 U.S.C. 154(b) by 0 days.

(21) Appl. No.: 09/639,274

(22) Filed: Aug. 15, 2000

Related U.S. Application Data

(62) Division of application No. 08/923,268, filed on Sep. 4, 1997, now Pat. No. 6,103,291.

(30) Foreign Application Priority Data

Sep. 5, 1996 (CL) .............................. CL-1569-96

(51) Int. Cl.[7] ...................................................... A23L 1/00
(52) U.S. Cl. ........................ 426/523; 426/510; 426/511
(58) Field of Search ................................. 426/523, 510, 426/511; 99/340, 403, 410, 413, 417

(56) References Cited

U.S. PATENT DOCUMENTS

| | | |
|---|---|---|
| 1,260,794 | 3/1918 | Paquette . |
| 3,808,963 | 5/1974 | Ludena . |
| 3,972,318 | 8/1976 | Lenoir . |
| 4,509,412 | 4/1985 | Whittenburg et al. . |
| 4,574,776 | 3/1986 | Hidle . |
| 4,604,989 | 8/1986 | Kita . |
| 4,626,352 | 12/1986 | Massey et al. . |
| 4,951,558 | 8/1990 | Filiuzzi . |
| 5,092,229 | 3/1992 | Chen . |
| 5,211,105 | 5/1993 | Liu . |
| 5,235,904 | 8/1993 | Ludena . |
| 5,355,777 | 10/1994 | Chen et al. . |
| 5,584,235 | 12/1996 | DuBois et al. . |
| 5,976,591 | * 11/1999 | Silva ..................................... 426/523 |

FOREIGN PATENT DOCUMENTS

WO96/32853 * 10/1996 (WO) .................................. 426/523

* cited by examiner

*Primary Examiner*—George C. Yeung
(74) *Attorney, Agent, or Firm*—Banner & Witcoff, Ltd.

(57) ABSTRACT

A process for ecologic cooking of food, comprising providing an external container, the external container having a cover, the cover having a regulator for regulating steam, gas generated in cooking of foods, or both; providing an internal container, the internal container containing foodstuff; wherein the internal container hangs inside the external container from one or two points; and a space is formed between the internal container and the external container preventing the foodstuffs from contacting with red-hot metal of the external container, and heating the internal container with water, steam, or water-steam wherein the maximum temperature reached by the foodstuff in the internal container is the temperature of the water, steam, or water-steam. Preferably a first ambient of heat tempered by humidity is formed in the internal container and the first ambient of heat is uniformly tempered with a second ambient of heat comprising heated water, steam, or heated water-steam. The second ambient of heat is formed in the space between the internal container and the external container; and foodstuff in the internal container is cooked by the first ambient of heat through the second ambient of heat, and the foodstuff is isolated from red-hot metal of the external container. The first ambient of heat and the second ambient of heat may be in communication with each other enabling interchange of water, steam, or both.

3 Claims, 6 Drawing Sheets

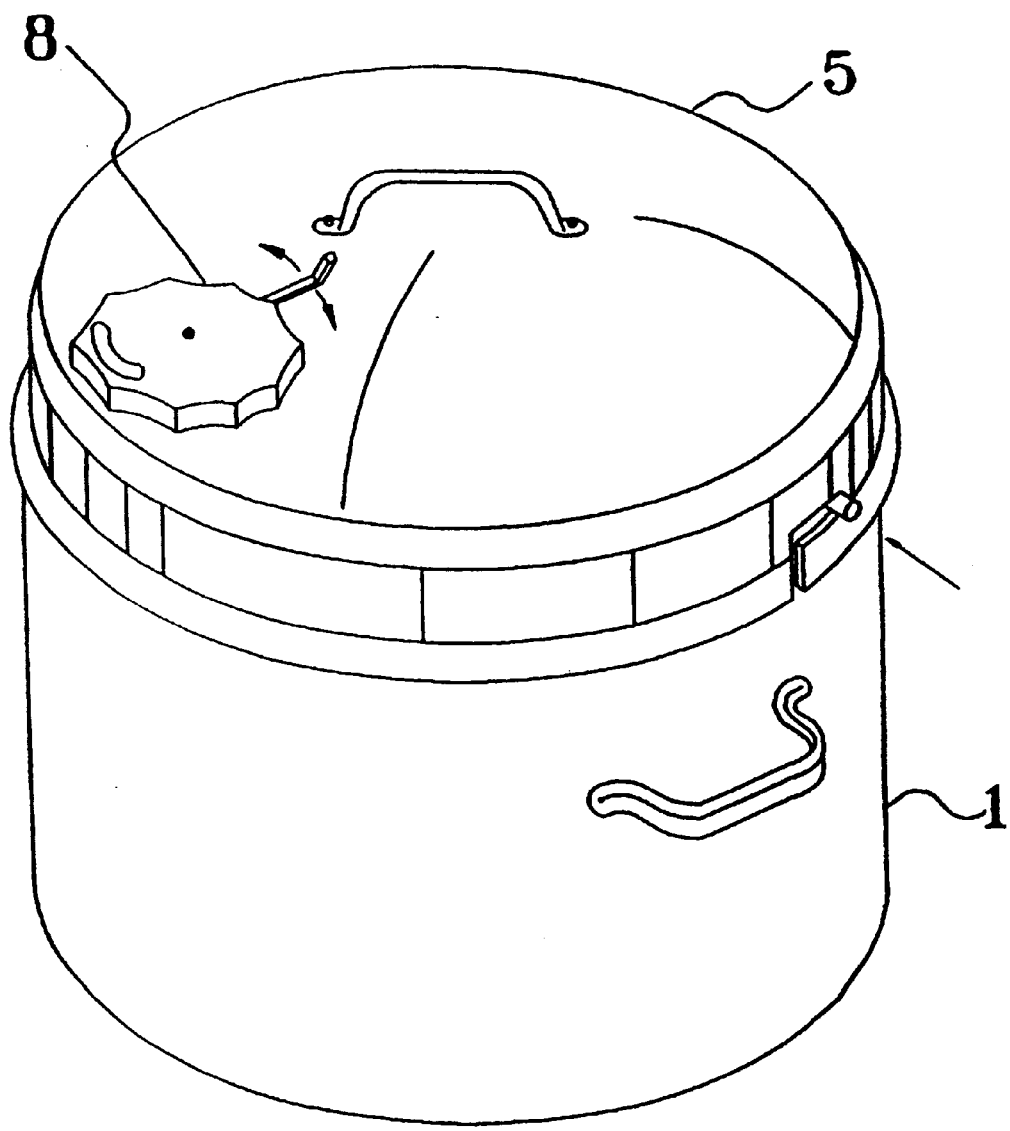
Fig: 1

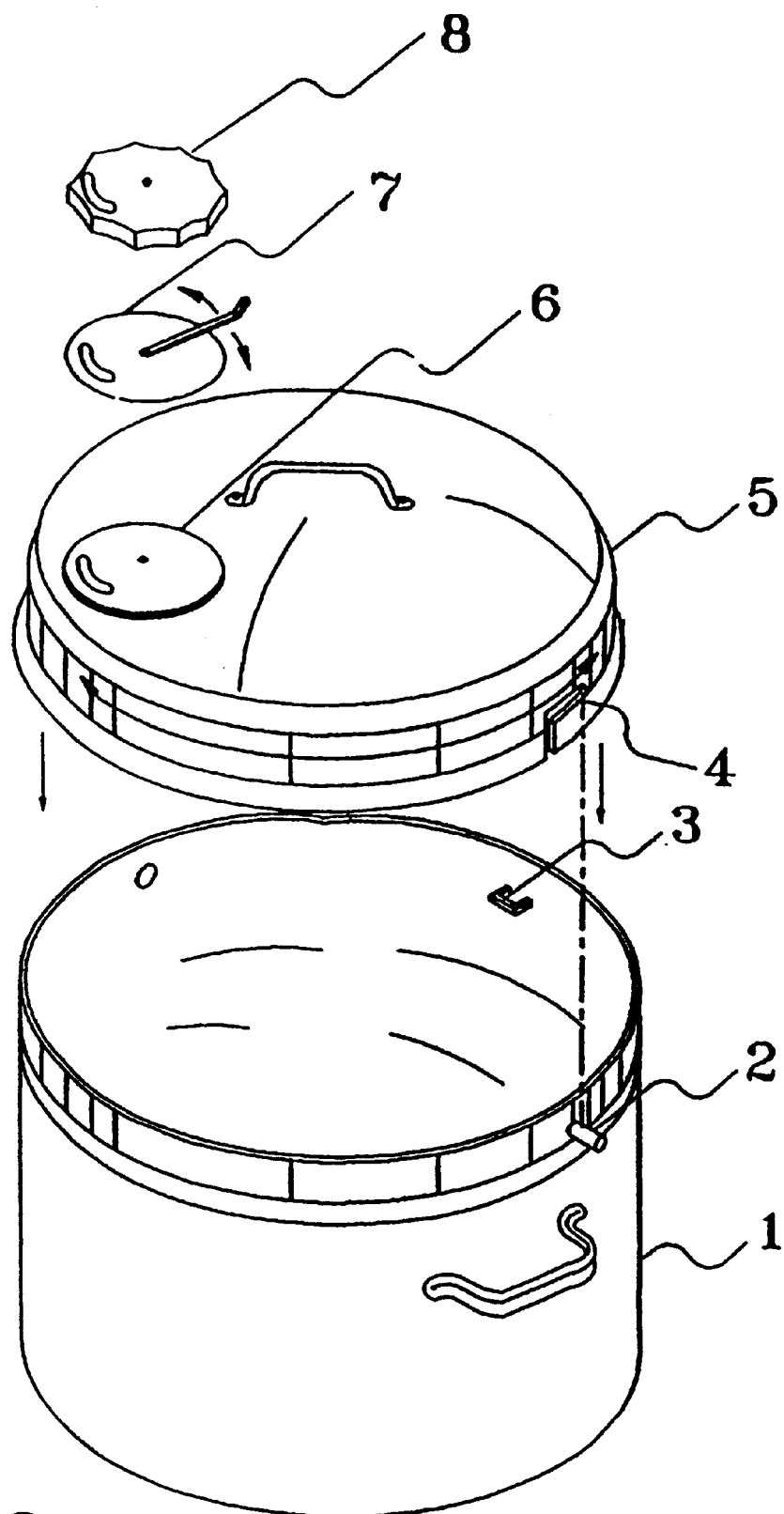
Fig: 2

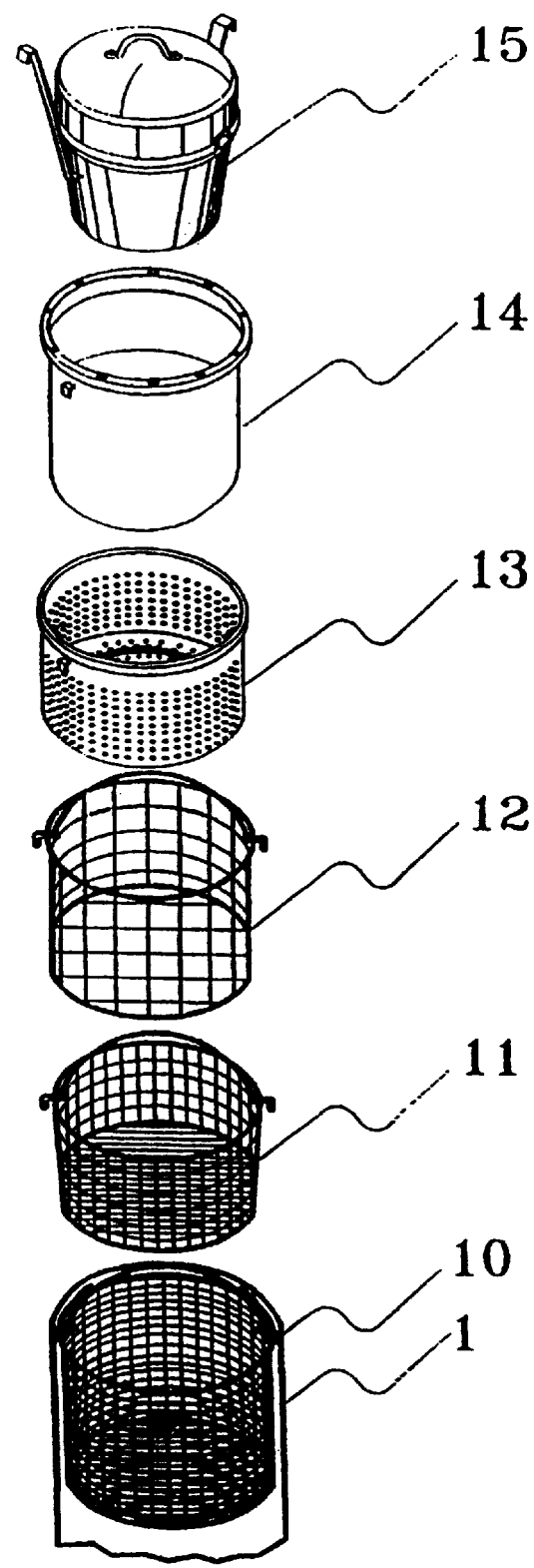
Fig: 3

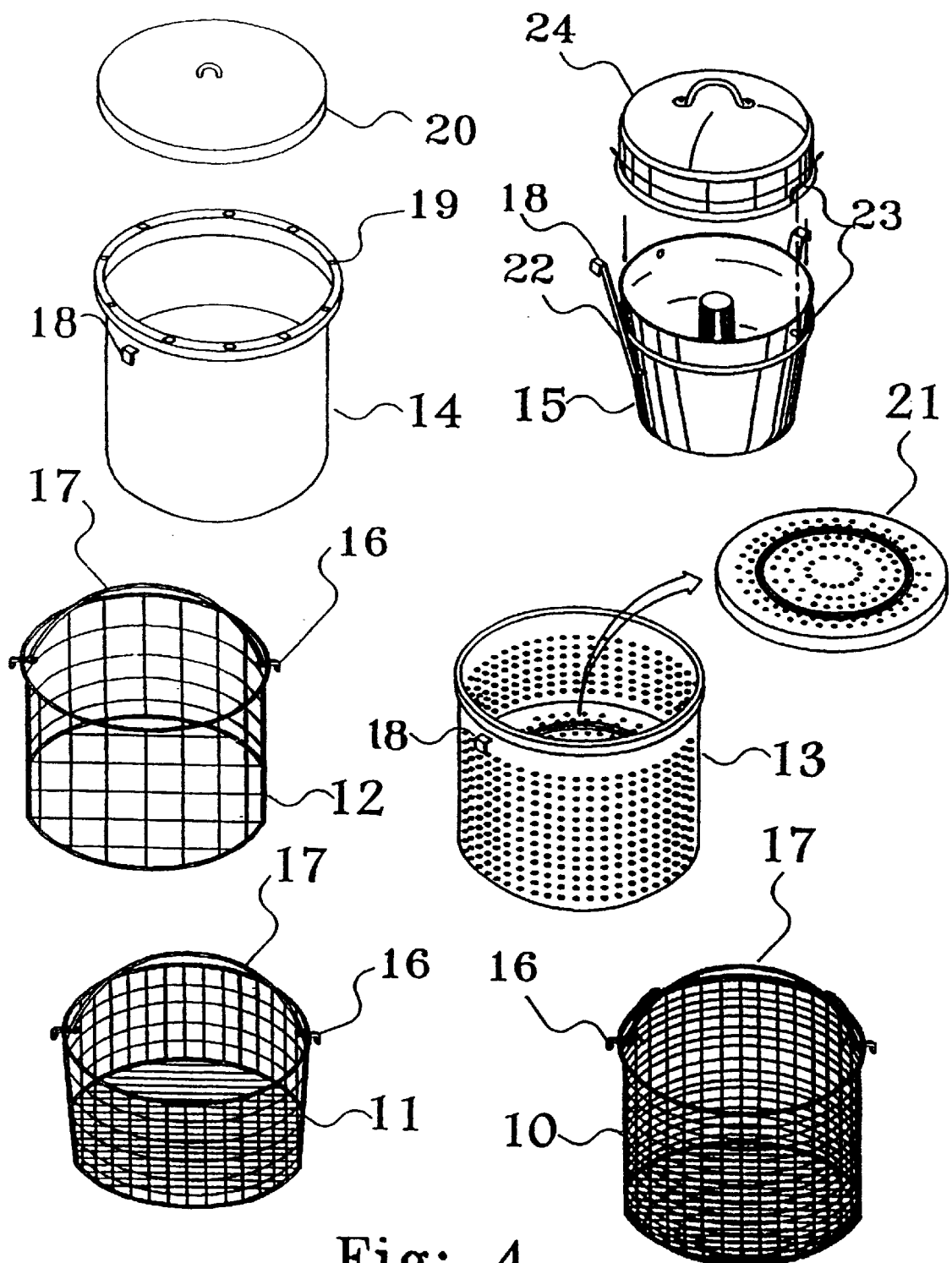
Fig: 4

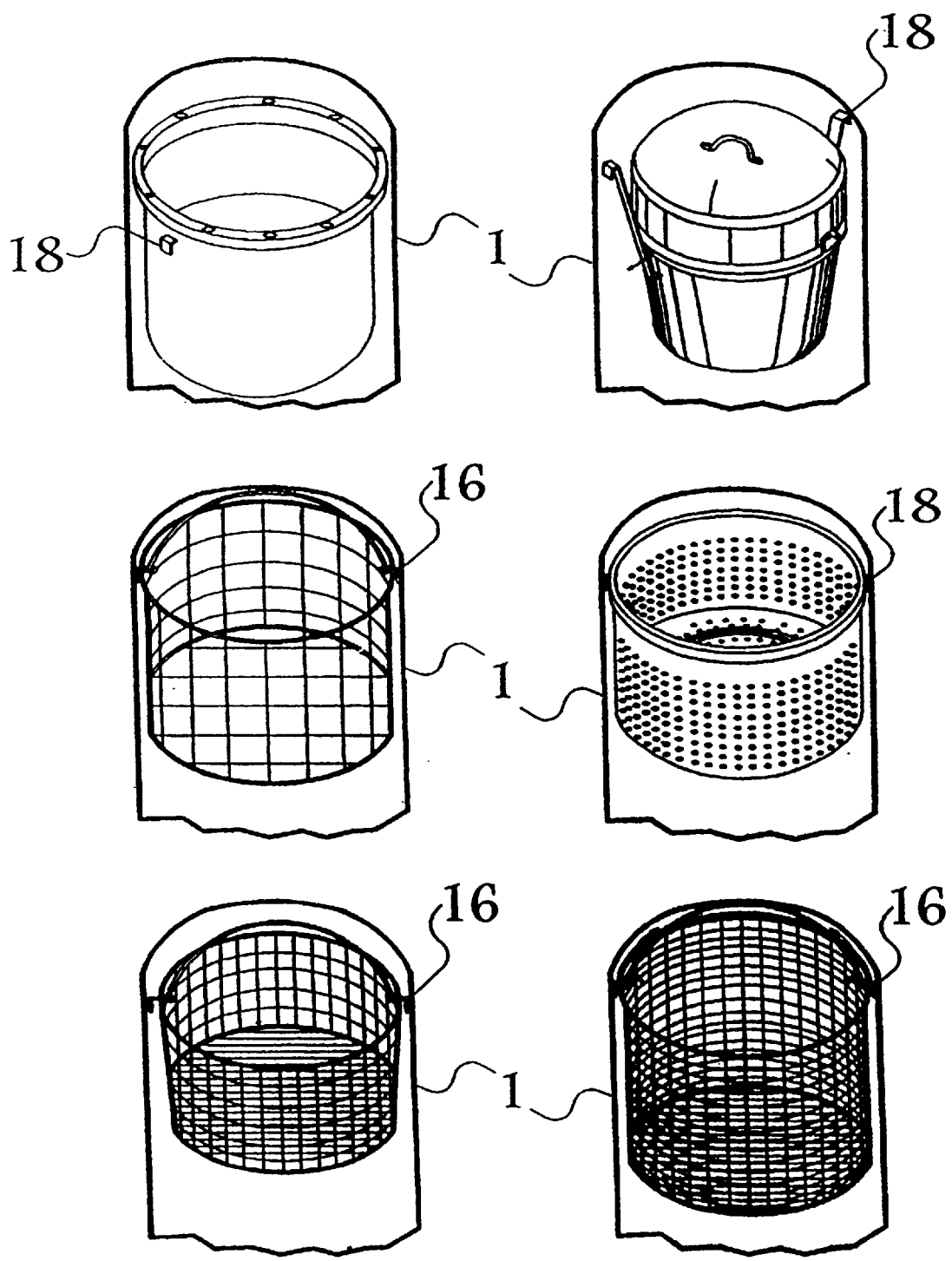
Fig: 5

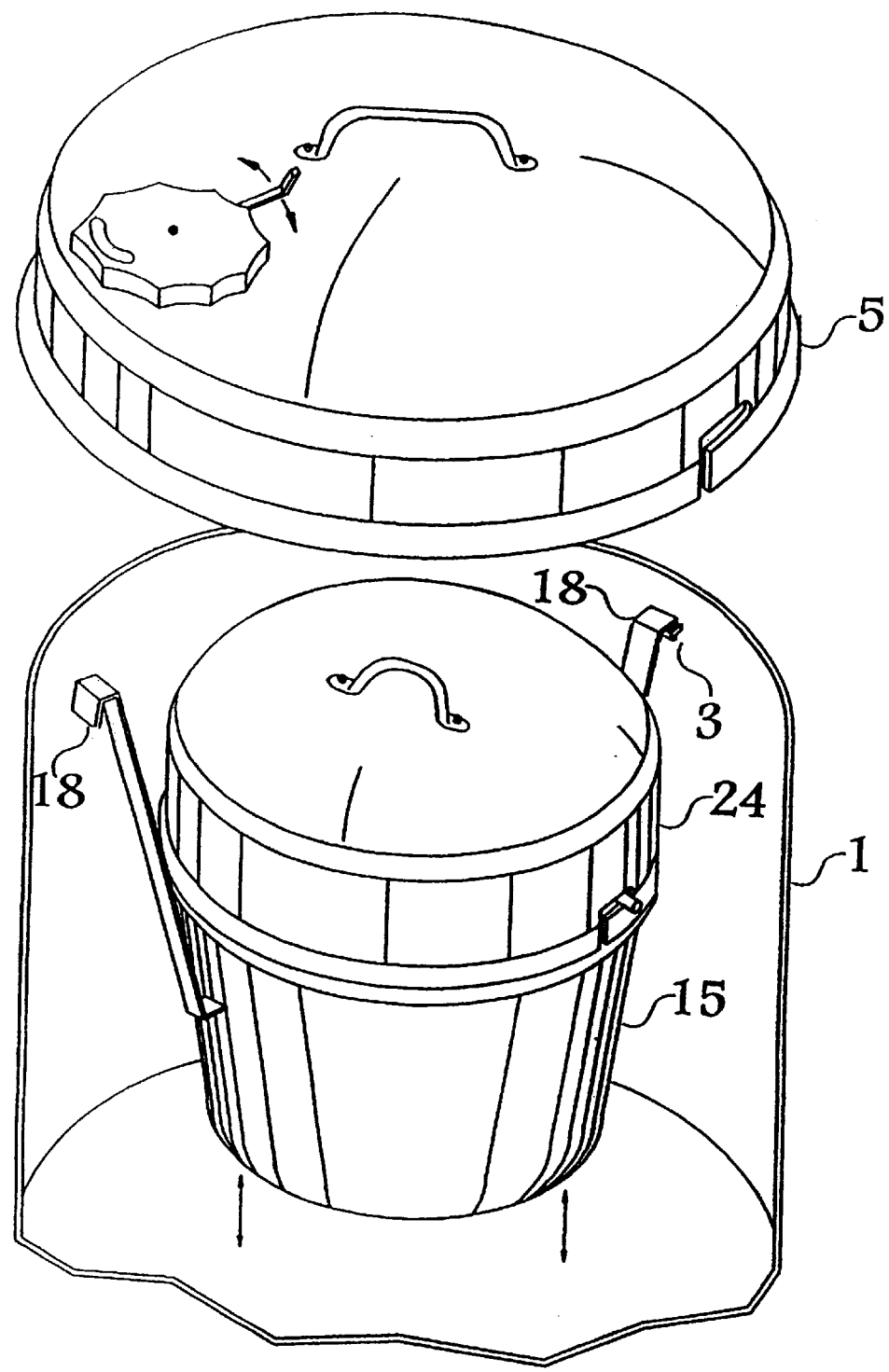
Fig: 6

PROCESS FOR ECOLOGIC COOKING OF FOODSTUFF

This application is a divisional of Ser. No. 08/923,268, filed Sep. 4, 1997, now U.S. Pat. No. 6,103,291.

SUMMARY OF THE INVENTION

The present invention relates to a system enabling ecologic cooking of food substantially by use of a kettle or external container, a cover, means for regulating the outlet of steam or aeriform fluids (gas generated in cooking of food) and a set of accessories or internal containers for cooking various types of food.

The ecologic cooking, according to the present invention, characterizes by creating an ambient of heat tempered by humidity producing an optimum medium for cooking the various types of food to be cooked isolated from red-hot metal, thereby preventing oxidation of food and other chemical phenomena at molecular level, which are most health injuring, substantially due to alteration of biochemical balance attacking the organic textures and appearing as dermatologic allergy, tumours, ulcer and other stomachic complications.

Ecologic cooking also prevents denutrition and loss of taste in food, and achieves substantial cost efficiency in kitchen. It may be applied to preparing all kind of food, mainly vegetables, legume, milky products, cooked dish, dough, sauces, and seafood (fish and shellfish).

DESCRIPTION OF PRIOR ART

Since displacement of older silt pots made of detersive fire-clay, with low iron content, able to absorb fats and to resist high temperatures, and replacement of this health-excellence using the modern metallic kettle, the problem of chemical alterations became a concern because they derive from the direct exposition of food to red-hot metal. Research work on this matter disclose that contact of food with metallic surface receiving direct action of fire or electrical heating, produces the oxidation of food and other chemical alterations at molecular level that causes health impairing.

Throughout history of use of metallic kettle several methods appeared for mitigating the effects of above mentioned issues. Among them, enamelled metal, teflon coating, water bath and cake pan should be mentioned. They have in common the purpose of mitigating the effects derived from exposing foodstuff to direct contact with red-hot metal. Recognizing the benefits provided by each of those methods, also some problems derived from their use have to be described. Perhaps the most efficient among all those may be the enamelled metal, but there are at least three drawbacks: high cost; extreme fragility which may easily destroy its qualities, due to hits damaging the enamelled surface and thereby exposing the food to red-hot metal, and over-exposition of food to fire-heat or electric heating. The teflon coating is also very expensive and is even brittler than enamel and additionally sensible to loss of qualities just due to rubbing and also exposes foods to heat. The water-bath and the cake-pan are advantageous cooking methods, unfortunately scarcely used at present due to following drawbacks in their use: excessive energy expense and excessive delay due to irregular cooking, normally exposed to cold on top of the food; danger from overflow and following disturbances and noise coming from continuous vertical and oscillatory movements of food containers.

Also known are a plurality of devices for cooking through a steam medium. There is per example a vessel used in Orient, concave shaped like frying pan with cover and furnished with an accessory formed by a timber cylinder including a central mesh for placing food. The bottom portion of said attachment lies on the vessel and in the bottom part there is a space for water evaporation. This device has the drawback to be only adequate for steam-cooking of foods and is not idoneous for any other type of cooking. Additionally it has no system for regulating the outlet of aeriform fluids or steam.

Moreover, there is a kettle on the market which permits to perform cooking by means of a steam ambient. Said kettle is commercially known as "magic oven". This device comprises an external container its bottom base having an opening for entrance of heat directly from fire. Within the external container an internal container is placed in which food is cooked, this container has also an opening coincident with the opening of the external container. The external container has a series of slots on its top perimeter matching homologous slots arranged on the cover of the external container. Nevertheless this device facilitates the cooking by steam and furthermore has a means for the regulation of steam outlet, its drawback is that it only enables steam-cooking and it has no alternative for food cooking only in water, or cooking food by water and steam. Further, this device permits only cooking of a certain number of food products, having a limiting range if it is required for cooking any kind of food. Moreover, as the internal container rests almost completely on the external container, this causes a heat transfer metal-to-metal, originating a excess of heat within the zone of contact between food and internal container.

Another similar device is marketed under the name "Frigi-Diet", this device being very similar to the above described one, the difference residing in the bottom opening having a plurality of perforations acting as heat diffuser. In practice, Frigi-Diet shows the same disadvantages as mentioned for "magic oven".

DESCRIPTION OF DRAWING

FIG. No. 1 shows a perspective view of the device of the invention in closed condition.

FIG. No. 2 shows an exploded perspective view of the device of the invention.

FIG. No. 3 shows a perspective view of different types of accessories or internal containers of the invention.

FIG. No. 4 shows a perspective view of accessories shown in FIG. No. 3 including examples of the elements for their support inside the external container.

FIG. No. 5 shows a perspective view of the accessories or internal containers hanging inside the external container.

FIG. No. 6 shows in detail one of the accessories or internal containers hanging inside the external container.

DESCRIPTION OF THE INVENTION

Referring to the drawings, the invention comprises an external container (1) having a cover (5) and means for auto-regulation or regulation by the user, of aeriform fluids and/or steam formed upon the circular embossment (6) which has a first circumferential segment slot upon which a circular sheet (7) is arranged, the last including a second circumferential segment slot, and this sheet is furnished with a maneuvering rod; the whole set being covered by a cap (8) including a third circumferential segment slot. The cap (8) may be attached upon the embossment (6), being threaded on the periphery of the embossment (6) and inside the cover (8). The cover (8) is mounted on the embossment (6) in a way that permits the free movement of the circular sheet (7), and as shown in FIG. No. 2, such means, by moving the rod, facilitate the aeriform fluid and/or steam outlet to be regulated by the user.

The cover (5) has been assembled upon the external container (1) by means of a semi-hermetic mechanism. The cover (5), on its perimetral sheet has two diametral opposed slots (4) in down-laid "L" form, the longer portion of the "L" slightly sloping up to the top side for engaging two projecting pins (2) arranged along the diameter in the upper zone on the outside of the external container (1) so as to facilitate securing the fixing of the cover (5) to said external container (1).

External container (1) has inside at top at least one female support (3) that may be "U" shaped and on which rest engaging male elements (16) and (18) from accessories or internal interchangeable containers (10), (11), (12,) (13), (14) and (15), so as to leave said internal containers hanging within the external container (1) thereby minimizing the metal-to-metal contact, enabling food placed inside these interchangeable accessories or internal containers to be cooked by combined effect of heat originated in the chamber of heat temperated by humidity in the upper zone of the external container (1)

In FIG.. No. 4 there are shown the preferred interchangeable accessories or internal containers of the invention. First is a cake-pan (15) comprising an external body (22) and a cover (24), both furnished with semi-hermetic fastening means (23) and bails for hanging with male engaging elements (18). Other one of the accessories is a fixed pot (14) furnished with a perimetral top lip comprising a plurality of holes (19) facilitating the easy pass of steam, generated in the lower portion of the external container (1), into its upper portion. Said accessory has a cover (20) which may be or may not be used, creating thereby the possibility for water-bath cooking, alternatively with or without steam. A third preferred accessory of the invention is a pot (13) furnished with a body shell comprising a plurality of perforations and male engaging elements (18) located in the upper zone. As shown in more detail in FIG.. No. 4, this accessory has a base plate (21) also having a plurality of perforations facilitating the water and/or steam contact, and thereby permitting the cooking of rice and legumes among others. A fourth accessory is a basket (12) for hot water bath of less height than the depth of the external container and furnished with male engaging elements (16) in the upper zone and a bale (17) facilitating locating and removal to and from the external container (1), this accessory being also used, e.g., for cooking of potatos, artichoke, corn, and the like. A fifth accessory is a mesh (11) for steam bath, for cooking, e.g., cauliflower, broccoli and seafood. The height of said accessory is lower than the depth of the external container and it has engaging male elements (16) in the upper zone and a bale (17). Another preferred accessory of the invention is a basket (10) for hot water bath and/or boiling, to be used preferently for dough, its height being slightly less than the depth of the external container so as to ensure the immersion of food in water. This accessory has also male engaging elements (16) on its upper zone and a bale (17).

The hanging means (3),(16),(18) for the accessories, the cover (5) with semi-hermetic closure made-up, per example, by projection (2) and the "L" channel (4), the aeriform fluid regulator with cap (8), the sheet (7), the embossment (6), and each of the interchangeable internal containers, collaborate in conjunction for ecologic cooking, by enabling the cooking in optimum humid ambient favourably regulated in accordance with the natural components and the degree of relative humidity of the food, to be achieved forming a uniform atmosphere of tempered heat by means of hot water and/or steam, always under conditions of isolation from red-hot metal through generation of a humidity chamber.

As will be apparent, one of the major advantages of the device of the invention is cooking of food within a humid atmosphere generated by water and/or steam, preventing food from direct contact with red-hot metal. Another outstanding advantage of the invention is that it permits cooking of large number of different food thanks to interchanging of accessories or internal containers. These containers could be hanged not only according to the preferred way shown in FIGS. No. 2, No. 4, and No. 5, but the male engaging means could also be located in the upper internal zone of the external container and the female support means could be located on the external upper zone of the internal container. Each one of these options permits a minimum of contact between the internal container and the external container so as to ensure that the food is cooked by the heat produce in the chamber of tempered heat and humidity. Moreover, the male engaging elements, (16) and (18) are only preferred alternatives of the invention and a person skilled in the art could certainly appreciate a large number of tongued and grooved elements which may be used for implementing the present invention.

It shows obvious from all foresaid, that the invention may be used for a large variety of food, permitting therewith the cooking of food only by an humid ambient, isolated from red-hot metal.

Thus, the invention may be enlarged to encompass a new food cooking process.

The new process for ecologic cooking of food comprises the following steps:

provision of an external container and corresponding cover;

furnishing said external container with a means for regulation of aeriform fluids and/or steam;

provision of a first ambient of heat tempered by humidity, containing the foodstuff to be cooked;

tempering uniformly from a second ambient comprising hot water and/or steam;

provision of an internal container hanging from at least one point on the external container, said internal container being immersed in the first ambient of heat tempered by humidity, permitting the food to be cooked completely isolated from any red-hot metal.

Notice that the main characteristic of the procedure, not anticipated up to date by the state of the art, is the placing of the internal container within an ambient of heat tempered by humidity, so that there is no one moment of contact with red-hot metal during the cooking, creating thereby the above discussed benefits.

At same time, a great advantage of the procedure consists in the fact that it may be used for a large variety of food, like vegetables, legumes, milky products, cooked dish, dough, sauces fish and seafood.

What is claimed is:

1. A process for ecologic cooking of food, comprising:
providing an external container, the external container having a cover, the cover having a regulator for regulating steam, gas generated in cooking of foods, or both;
providing an internal container, the internal container containing foodstuff;

wherein the internal container hangs inside the external container from one or two points; and a space is formed between the internal container and the external container preventing the foodstuffs from contacting with red-hot metal of the external container, and heating the internal container with water, steam, or water-steam wherein the maximum temperature reached by the foodstuff in the internal container is the temperature of the water, steam, or water-steam.

2. The process as claimed in claim 1, further comprising forming a first ambient of heat tempered by humidity in the internal container;

uniformly tempering the first ambient of heat with a second ambient of heat comprising heated water, steam, or heated water-steam, the second ambient of heat formed in the space between the internal container and the external container; and cooking foodstuff in the internal container by the first ambient of heat through the second ambient of heat, wherein the foodstuff is isolated from the external container.

3. The process as claimed in claim 2, wherein the first ambient of heat and the second ambient of heat are in communication with each other enabling interchange of water, steam, or both.

* * * * *